(12) United States Patent
Wirth (10) Patent No.: US 11,674,453 B2
(45) Date of Patent: Jun. 13, 2023

(54) GAS TURBINE ENGINE HAVING HOLLOW LOW-PRESSURE SHAFT WITH INTEGRATED VALVE FOR DELIVERING HOT COMPRESSED AIR TO A FAN DISK

(71) Applicant: Rolls-Royce Deutschland Ltd & Co KG, Blankenfelde-Mahlow (DE)

(72) Inventor: Moritz Wirth, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/745,532

(22) Filed: May 16, 2022

(65) Prior Publication Data

US 2022/0412273 A1    Dec. 29, 2022

(30) Foreign Application Priority Data

Jun. 25, 2021    (DE) ..................... 10 2021 116 507.5

(51) Int. Cl.
*F02C 9/18*    (2006.01)
*F02K 3/04*    (2006.01)
(Continued)

(52) U.S. Cl.
CPC ............. *F02C 9/18* (2013.01); *B64D 15/04* (2013.01); *F02C 6/08* (2013.01); *F02C 7/047* (2013.01); *F02K 3/04* (2013.01); *F02K 3/06* (2013.01)

(58) Field of Classification Search
CPC .... F02C 6/06; F02C 6/08; F02C 6/047; F02C 9/18; F02K 3/04; F02K 3/06;
(Continued)

(56) References Cited

U.S. PATENT DOCUMENTS 3,712,756 A  *  1/1973  Kalikow ................... F01D 5/08
                                                    137/56
3,925,979 A  *  12/1975  Ziegler .................. F02C 7/047
                                                    415/176
(Continued)

FOREIGN PATENT DOCUMENTS

| CN | 107061013 A | 8/2017 |
|---|---|---|
| DE | 3013974 A1 | 10/1980 |
| DE | 3912196 A1 | 10/1989 |

OTHER PUBLICATIONS

German Search Report dated Jan. 26, 2022 from counterpart German Patent Application No. 10 2021 116 507.5.

*Primary Examiner* — Alain Chau
(74) *Attorney, Agent, or Firm* — Shuttleworth & Ingersoll, PLC; Timothy Klima (57) ABSTRACT

A gas turbine engine has an engine core, a fan arranged upstream of the engine core, and a hollow low-pressure shaft. The low-pressure shaft includes axially front and rear ends, wherein hot compressor air is applied to the axially rear end during operation. A valve is integrated into the interior of the low-pressure shaft, configured to open or close in accordance with the rotational speed of the low-pressure shaft, wherein the valve is closed from a predefined rotational speed and is open below this rotational speed, and wherein the valve, in the open state, allows hot compressor air to flow from the axially rear end of the low-pressure shaft to the axially front end of the low-pressure shaft and, in the closed state, prevents hot compressor air from flowing through the low-pressure shaft. A mechanism, when the valve is open, feeds hot compressor air outside of the fan disk.

16 Claims, 6 Drawing Sheets

(51) Int. Cl.
*B64D 15/04* (2006.01)
*F02C 6/08* (2006.01)
*F02C 7/047* (2006.01)
*F02K 3/06* (2006.01)

(58) Field of Classification Search
CPC .................. B64D 15/02; B64D 15/04; B64D 2033/0233; F01D 5/08; F01D 25/02; F01D 17/205
See application file for complete search history.

(56) References Cited

U.S. PATENT DOCUMENTS

| | | | |
|---|---|---|---|
| 4,941,317 A * | 7/1990 | Ivey | F01D 25/02 |
| | | | 60/39.093 |
| 10,634,050 B2 * | 4/2020 | Beutin | F02C 9/18 |
| 11,008,979 B2 * | 5/2021 | McCaffrey | F01D 17/205 |
| 2007/0065292 A1 | 3/2007 | Schilling | |
| 2007/0220899 A1 | 3/2007 | Earith et al. | |
| 2017/0314465 A1 * | 11/2017 | Beutin | F02C 7/185 |
| 2018/0128173 A1 | 5/2018 | Lemarchand et al. | |
| 2020/0378343 A1 * | 12/2020 | McCaffrey | F04D 27/0215 |

* cited by examiner

GAS TURBINE ENGINE HAVING HOLLOW LOW-PRESSURE SHAFT WITH INTEGRATED VALVE FOR DELIVERING HOT COMPRESSED AIR TO A FAN DISK

This application claims priority to German Patent Application DE102021116507.5 filed Jun. 25, 2021, the entirety of which is incorporated by reference herein.

The invention relates to a gas turbine engine as disclosed herein.

One known practice is to produce the fan of a gas turbine engine as a blisk, in which case the fan disk and the fan blades are formed in one piece. However, fans of blisk-type construction have a greater tendency for ice formation. This is related to the fact that the fan blades of a fan blisk are designed to be more rigid and are subject to less bending in comparison with fan blades which are each individually connected to the fan disk. As a result, lower shear forces are introduced into the surface of the fan blades. This makes it more difficult for ice that has formed to detach itself from the fan blisk, and therefore thicker layers of ice may form. In addition, there are no relative movements between the fan blades and the fan disk in the case of a fan blisk, and this likewise impairs regular detachment of ice that forms. If the ice accumulated into thicker layers comes away, this can lead to undesirable imbalances.

The invention is based on the object of providing a gas turbine engine in the case of which the risk of icing of the fan is reduced.

This object is achieved by a gas turbine engine having features as disclosed herein. Refinements of the invention are indicated in the present disclosure.

Accordingly, the invention relates to a gas turbine engine which has an engine core, which comprises at least one compressor, a combustion chamber, a high-pressure turbine and a low-pressure turbine. Arranged upstream of the engine core is a fan, which comprises a fan disk and fan blades connected to the fan disk. Furthermore, the gas turbine engine comprises a low-pressure shaft designed as a hollow shaft, which is coupled to the low-pressure turbine and which drives the fan. Here, the low-pressure shaft comprises an axially front end and an axially rear end, wherein hot compressor air is applied to the axially rear end during operation of the gas turbine engine.

It is envisaged that a valve is integrated into the interior of the low-pressure shaft, which valve is provided and designed to open or close in accordance with the rotational speed of the low-pressure shaft, wherein the valve is closed from a predefined rotational speed and is open below this rotational speed, and wherein the valve is furthermore designed, in the open state, to allow the hot compressor air applied to the axially rear end of the low-pressure shaft to flow from the axially rear end of the low-pressure shaft to the axially front end of the low-pressure shaft and, in the closed state, to prevent the hot compressor air applied to the axially rear end of the low-pressure shaft from flowing through the low-pressure shaft. It is furthermore envisaged that the gas turbine engine comprises means which, when the valve is open, feed hot compressor air flowing axially forward to the outside of the fan disk.

The solution according to the invention is based on the concept of using compressor air to heat the fan and thereby prevent or at least reduce icing of the fan, the compressor air being transferred axially forward to the fan disk via the low-pressure shaft. In this case, such axially forward transfer of hot compressor air takes place via a valve, which is arranged in the interior of the low-pressure shaft and which opens only from a certain rotational speed of the low-pressure shaft. This is associated with the advantage that the diversion of hot compressor air to heat the fan disk is avoided at high rotational speeds, such as those which are present during take-off thrust, climbing thrust or cruising thrust: On the one hand, there is no risk of ice formation at high rotational speeds. On the other hand, diversion of compressor air axially forward to the fan disk through the low-pressure shaft increases the fuel consumption of the gas turbine engine since the diverted compressor air can no longer fulfill its original purpose, namely, as sealing air, to prevent losses due to the escape of gas from the main flow path in the region of the low-pressure turbine.

The solution according to the invention thus achieves prevention of ice formation on the fan without substantially affecting the efficiency of the engine.

In contrast, at low rotational speeds of the low-pressure shaft, such as those which occur, for example, during descent, the solution according to the invention results in heating of the fan. There is a particular risk of ice formation during descent when the vehicle passes through the cloud cover.

The valve provided according to the invention also prevents a nose cone arranged upstream of the fan from heating up to temperatures above the design temperature. This risk would be present if hot compressor air were applied continuously to the fan disk.

As stated, the low-pressure shaft is coupled to the low-pressure turbine, and the low-pressure shaft drives the fan. Attention is drawn to the fact that the driving of the fan by the low-pressure shaft can take place directly or, alternatively, indirectly using a reduction gear box, for example a planetary gear box, such a reduction gear box being connected on the input side to the low-pressure shaft and driving a fan shaft, at reduced rotational speed, on the output side. In the case of a reduction gear box, the hot compressor air flowing axially forward via the interior of the low-pressure shaft when the valve is open is guided past the reduction gear box and further axially forward in the interior of the fan shaft.

According to one embodiment of the invention, it is envisaged that the valve is designed as a spring-loaded valve which closes from the predefined rotational speed. In this case, the spring-loaded valve forms a closure part which closes an opening of the valve from the predefined rotational speed. The spring-loaded valve is closed when the centrifugal force acting on the valve deflects the spring to a sufficient extent. In the unloaded state, the spring-loaded valve is thus in a position in which the valve opening is exposed.

Such a purely mechanical implementation of the valve operates completely autonomously without the need for a control or monitoring system. However, it is pointed out that, in alternative embodiments, provision can be made for the valve to be electrically opened and closed, the valve receiving corresponding control commands from a control system, depending on the rotational speed of the low-pressure shaft.

One embodiment variant envisages that the valve comprises a valve body, an opening in the valve body and a leaf spring, wherein the leaf spring runs in the axial direction and is designed to be at a distance from the opening in the valve body at low rotational speeds which are below the predefined rotational speed, and to close the opening in the valve body at high rotational speeds which are above the predefined rotational speed by means of the centrifugal force acting on it.

Owing to the axial extent of the leaf spring, the centrifugal force acting on the leaf spring increases with increasing rotational speed of the low-pressure shaft.

Provision can be made here for the leaf spring to have a first leaf spring end articulated on the valve body and a second leaf spring end remote from the valve body, wherein the second leaf spring end has a projection which forms a closure part of the valve which closes the opening in the valve body from the predefined rotational speed. With increasing rotational speed, the projection is pressed into the opening of the valve body. In this case, provision can be made for the opening of the valve body to be formed in an obliquely running wall of the valve body. Provision can furthermore be made for a sealing surface of the projection formed on the leaf spring to be formed by chamfers on the projection. This permits a simple and reliable implementation of a spring-loaded valve, which closes from a certain rotational speed or centrifugal force acting on it.

An alternative embodiment envisages that the valve comprises a valve ring provided with at least one opening or a valve disk provided with at least one opening, which extends in the radial direction in the interior of the low-pressure shaft and whose radially outer end rests against the inner wall of the low-pressure shaft, wherein the valve comprises spring means which close or open the at least one opening in accordance with the rotational speed.

In this case, the valve ring or the valve disk is provided with openings in such a way, for example, that openings are formed in the valve ring or the valve disk at a distance from one another in the circumferential direction in the radially outer region of the valve ring or of the valve disk.

In this case, the valve comprises a valve ring if there is a further shaft co-rotating with the low-pressure shaft within the low-pressure shaft, with the result that the cross section of the low-pressure shaft through which air can flow is annular. The further shaft, which runs coaxially with the low-pressure shaft, is, for example, an additional shaft, which is used in a manner known per se in the event of a shaft breakage. If, on the other hand, no further shaft is arranged in the interior of the low-pressure shaft, then the cross section of the low-pressure shaft through which air can flow is circular and in this case the valve comprises a valve disk.

In the embodiment variant mentioned with a valve ring or valve disk, provision can be made for the spring means to be designed as a snap ring whose ends form a gap between them in the circumferential direction, wherein the snap ring expands as the rotational speed increases owing to the centrifugal force acting on it and assumes a shape in which it closes the at least one opening from the predefined rotational speed.

One embodiment variant thereof envisages that the snap ring is of U-shaped design in cross section and has two legs which are spaced apart in the axial direction and run in the radial direction and are connected to one another by a base, wherein the U formed by the snap ring is open radially outward, the valve ring or the valve disk has a radially inward-projecting leg, wherein the snap ring is positioned in such a way relative to the radially inward-projecting leg that the radially inward-projecting leg is arranged between the two legs of the snap ring and guides the snap ring in the radial direction.

Such a design permits precise guidance of the snap ring, which covers the openings in the valve ring or the valve disk in accordance with the rotational speed, in the radial direction along the valve ring or the valve disk.

In accordance with the already mentioned variants, that a further shaft is or is not arranged in the interior of the low-pressure shaft, the valve body is of annular or circular design in the view axially from the rear. If an additional shaft is arranged in the interior of the low-pressure shaft, the valve is supported radially on the inside of the additional shaft.

As explained, the gas turbine engine comprises means which, when the valve is open, feed hot compressor air flowing axially forward to the outside of the fan disk. To implement such means, one embodiment variant envisages that openings, which feed hot compressor air, which flows from the axially rear end of the low-pressure shaft through the valve to the axially front end of the low-pressure shaft, to the outside of the fan disk, are provided in the fan disk or adjacent to the latter, wherein the outside of the fan disk provides the inner annulus of the flow duct through the fan.

In this case, it is naturally envisaged that the hot compressor air is fed to the outside of the fan disk at its axially front end, thus enabling a heating effect or temperature increase to take place over the entire axial length of the fan disk. In this case, the heating effect typically also extends in each case to the lower third of the fan blades, which is likewise affected by possible ice formation.

One embodiment variant envisages that the openings via which the hot compressor air is fed to the annulus are formed between the upstream end of the fan disk and the downstream end of a nose cone connected to the fan disk. A nose cone is arranged upstream of the fan disk on the axis of rotation of the fan and diverts the air coming from the engine intake in the direction of the fan blades. For this purpose, there is a known practice of fastening the nose cone to fastening elements that project axially forward from the fan disk. Openings can be provided, in the region of such fastenings for example, for the passage of the hot compressor air.

According to one embodiment of the invention, the fan is embodied as a blisk (blisk="blade integrated disk"), i.e. the fan disk and the fan blades are formed integrally (in one piece). In such an embodiment, the advantages associated with the present connection come into play to a particular extent since a fan of blisk-type construction (fan blisk), as explained at the outset, is particularly exposed to ice formation.

The core engine of the compressor comprises a high-pressure compressor. One embodiment of the invention envisages that bleed air is branched off from the high-pressure compressor, wherein some of the bleed air is fed to the low-pressure turbine as sealing air and forms the hot compressor air which is applied to the axially rear end of the low-pressure shaft during operation of the gas turbine engine. In principle, however, the bleed air which is applied to the axially rear end of the low-pressure shaft can also originate from some other compressor, for example a medium-pressure compressor (if present).

According to exemplary embodiments of the invention, the predefined rotational speed from which the valve is closed is reached at rotational speeds which are present during the descent of an aircraft in which the gas turbine engine is installed. This is associated with the advantage that the fan is heated right at the start of the descent and can warm up, with the result that, in a descent phase in which the aircraft is flying through clouds and there is a particular risk of ice formation, the fan is then already preheated and even incipient ice formation is counteracted.

According to one embodiment of the invention, the valve is controlled exclusively mechanically, i.e. the transition from the closed state to the open state and vice versa is achieved exclusively by mechanical means in accordance with the effective centrifugal force. This allows an autonomous embodiment of the valve in the gas turbine engine, without the need for control by a control unit.

It is pointed out that the present invention is described with reference to a cylindrical coordinate system which has the coordinates x, r, and φ. Herein x indicates the axial direction, r indicates the radial direction, and φ indicates the angle in the circumferential direction. The axial direction herein is defined by the machine axis of the gas turbine engine in which the present invention is implemented, wherein the axial direction is that from the engine inlet in the direction of the engine outlet. Proceeding from the x-axis, the radial direction points radially outward. Terms such as "in front of", "behind", "front", and "rear" refer to the axial direction, or the flow direction in the engine. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure may be particularly, although not exclusively, beneficial for fans that are driven via a gear box. Accordingly, the gas turbine engine may comprise a gear box which receives an input from the core shaft and provides drive for the fan, so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, the second compressor and the second core shaft may be arranged to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by that core shaft (for example only by the first core shaft, and not the second core shaft, in the example above) which is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that the angle of incidence of said variable stator blades may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade over which gas flows, that is to say the portion that is situated radially outside any platform.

The radius of the fan can be measured between the engine center line and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of a non-limiting example, the overall pressure ratio of a gas turbine engine as described and/or claimed herein at constant speed can be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine may be defined as the net thrust of the engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade described and/or claimed herein may be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to produce such a blisk or such a bling. For example, at least some of the fan blades can be machined from a block and/or at least some of the fan blades can be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

In use, a gas turbine engine described and/or claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawings.

Figure 1:
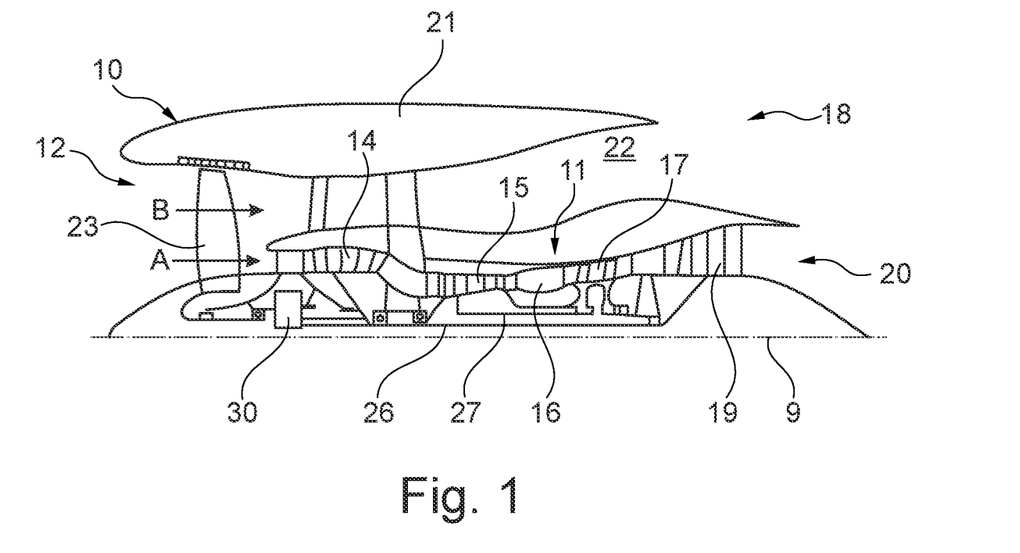
FIG. 1 shows a lateral sectional view of a gas turbine engine.

FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
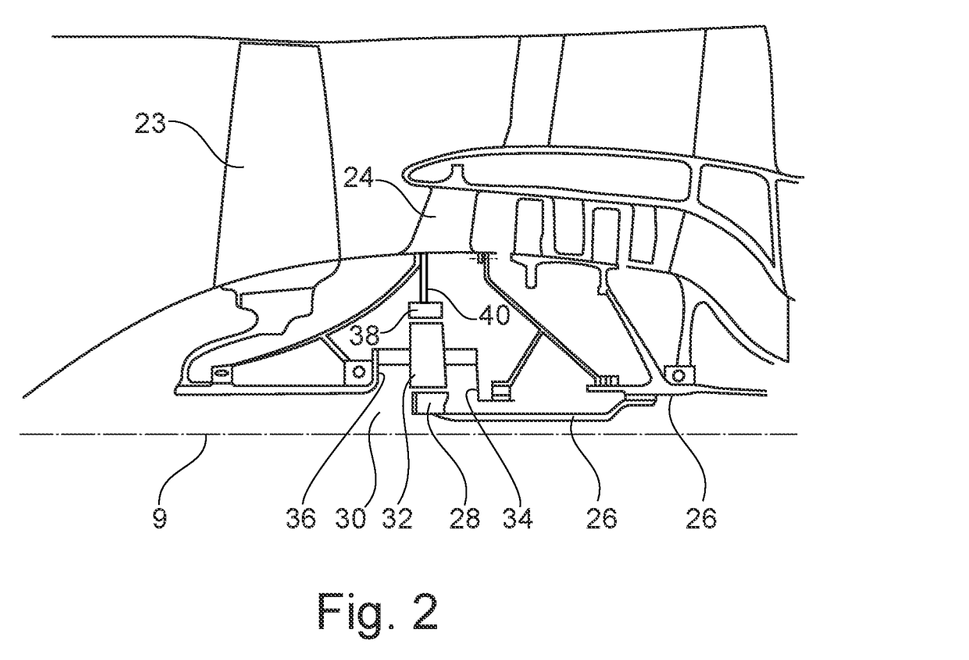
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting around the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
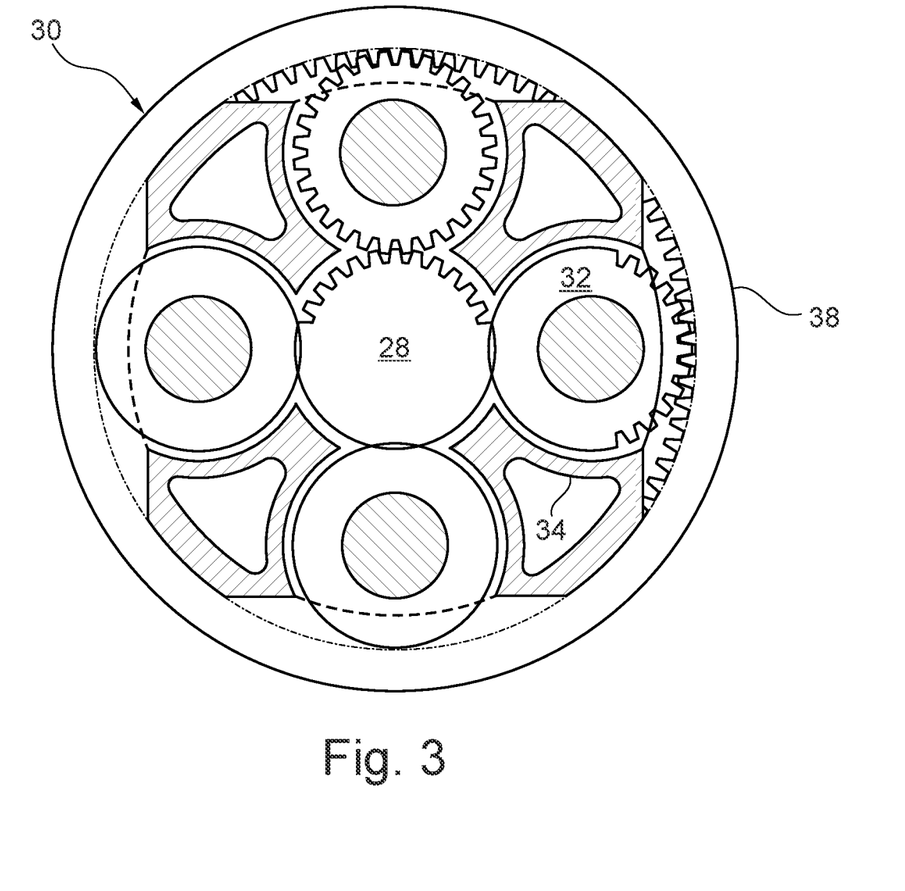
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to a person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in which the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It is self-evident that the arrangement shown in FIGS. 2 and 3 is merely an example, and various alternatives fall within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has its own nozzle, which is separate from the engine core nozzle 20 and is radially on the outside with respect to the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 possibly does not comprise a gear box 30.

The geometry of the gas turbine engine 10, and components thereof, is/are defined by a conventional axis system, which comprises an axial direction (which is aligned with the axis of rotation 9), a radial direction (in the direction from bottom to top in FIG. 1), and a circumferential direction (perpendicular to the view in FIG. 1). The axial, radial and circumferential directions are mutually perpendicular.

In the context of the present invention, the configuration of the shaft 26 which is coupled to the low-pressure turbine 19 and is referred to below as the low-pressure shaft 26 is of importance. Here, the low-pressure shaft 26 can drive the fan 23 indirectly via a planetary gear box 30 in accordance with the configuration of FIGS. 1-3. Alternatively, provision can be made for the low-pressure shaft 26 to drive the fan 23 directly if the gas turbine engine is designed without a planetary gear box 30. The exemplary embodiments of the present invention which are described below relate to the second case of direct coupling between the low-pressure shaft 26 and the fan 23. However, the principles of the present invention apply in a corresponding manner to a gas turbine engine with a planetary gear box.

Figure 4:
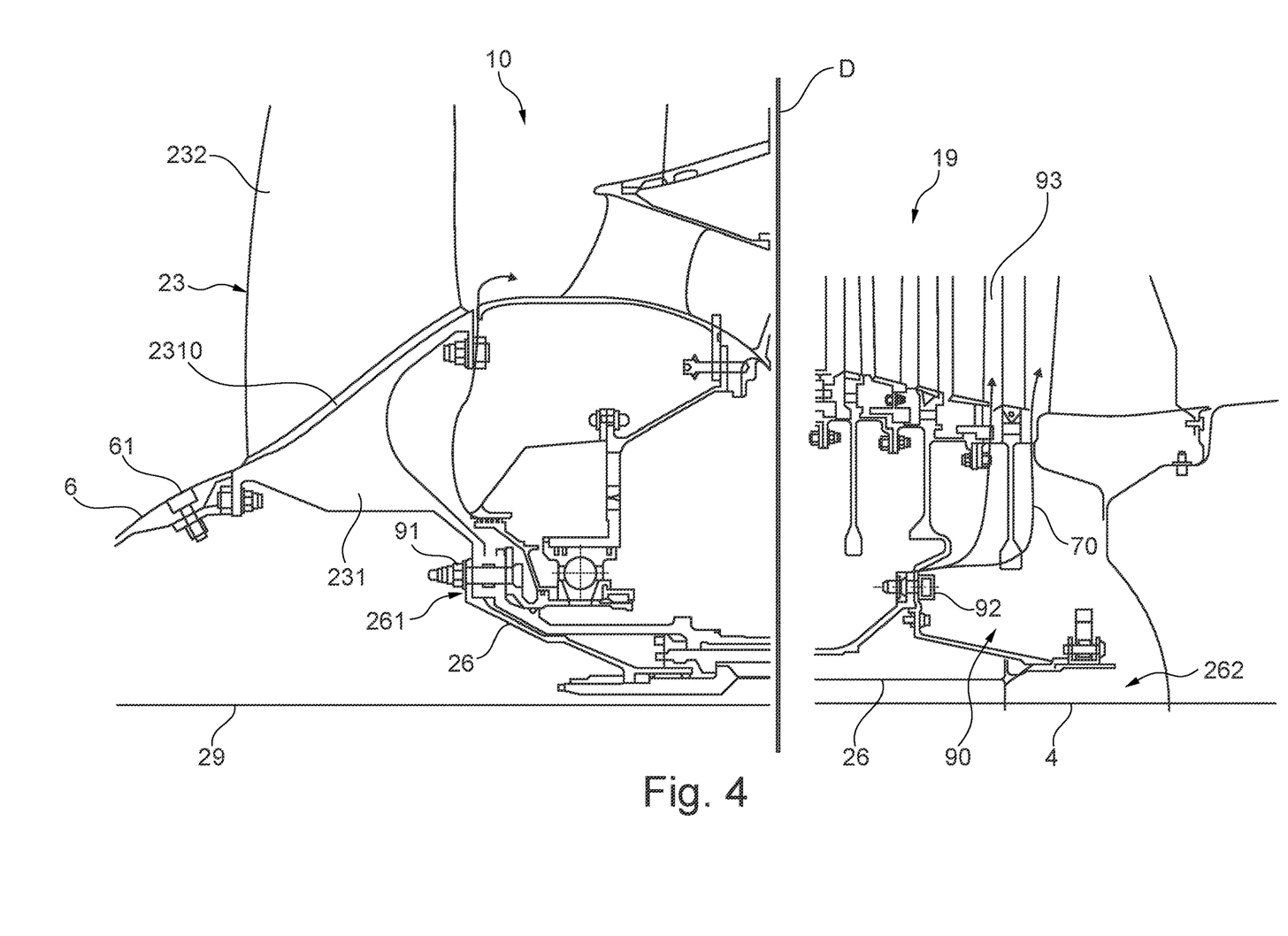
FIG. 4 shows portions of a gas turbine engine without a planetary gear box according to the prior art, wherein the gas turbine engine comprises a low-pressure shaft, which couples the low-pressure turbine of the gas turbine engine to the fan, and the low-pressure shaft is closed in a gas-tight manner at its axially rear end.

First, for a better understanding of the background of the present invention, a further gas turbine engine according to the prior art will be explained. Fundamentally, the gas turbine engine 10 in FIG. 4 is constructed in a similar way to the gas turbine engine in FIGS. 1 and 2, but does not have a planetary gear box. FIG. 4 shows only an axially front portion and an axially rear portion of the gas turbine engine 10. The portion in between is not illustrated and is symbolically replaced by the line D.

In the axially front portion of the gas turbine engine, a blisk-type fan 23 is illustrated which has a fan disk 231 on the outside 2310 of which a plurality of fan blades 232 is arranged in a manner known per se. In this case, the outside 2310 of the fan 23 forms the inner annulus of the flow path through the fan 23. A nose cone 6 is arranged upstream of the fan 23 and is fastened by means of fastening screws 61 to fastening elements that project axially forward from the fan disk 231.

FIG. 4 also illustrates the axially front region and the axially rear region of a low-pressure shaft 26 of the gas turbine engine. The low-pressure shaft 26 comprises an axially front end 261 and an axially rear end 262. At its axially front end 261, it is connected to the fan disk 231 via fastening elements 91 for conjoint rotation therewith.

The axially rear portion of the gas turbine engine of FIG. 4 shows the region of the low-pressure turbine 19, which comprises a plurality of turbine stages, wherein the rotor of at least one turbine stage is coupled to the low-pressure shaft 26 via fastening means 92 for conjoint rotation therewith, with the result that the low-pressure shaft 26 coupled to the low-pressure turbine 19 drives the fan 23.

The main flow duct 93 runs through the core engine via the low-pressure turbine 19. It is known and envisaged that leakage losses from the main flow duct 93, which are unwanted because they reduce efficiency and increase fuel consumption, can be reduced if the seals are in each case acted upon between the rotor and the stator by sealing air 70, which is taken as bleed air from one or more compressor stages of a compressor, in particular of the high-pressure compressor. This sealing air 70 is applied with increased pressure in a rear region 90 of the gas turbine engine and thus also at the axially rear end 262 of the low-pressure shaft 26. In order to prevent the compressor air applied to the rear end 262 of the low-pressure shaft 26 from penetrating into the interior of the low-pressure shaft 26, the latter is closed by a closure ring 263. This is because an escape of compressor air or sealing air 70 via the low-pressure shaft 26 would reduce the sealing effect of the sealing air 70 on the main flow duct 93 and thus increase fuel consumption.

Figure 5:
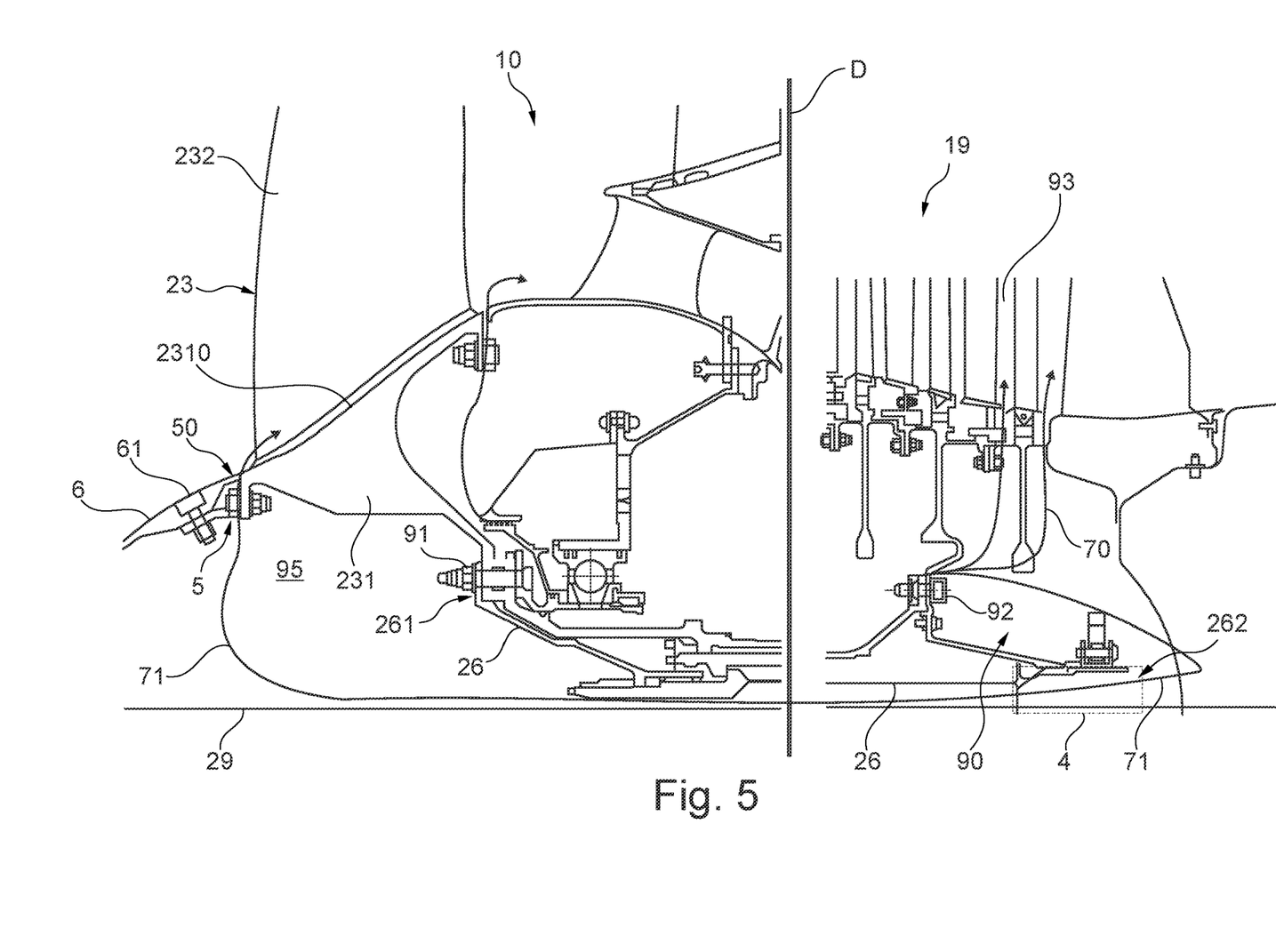
FIG. 5 shows portions of an exemplary embodiment of a gas turbine engine, wherein the gas turbine engine comprises a low-pressure shaft, which couples the low-pressure turbine of the gas turbine engine to the fan, and the low-pressure shaft is provided on the inside with a valve which closes from a predefined rotational speed of the low-pressure shaft.

FIG. 5 shows an exemplary embodiment of a gas turbine engine represented in the same way as in FIG. 4. The difference with respect to the gas turbine engine in FIG. 4 is that the closure ring 263 in FIG. 4 is replaced by a valve 4, which is illustrated only schematically in FIG. 5 and is explained in more detail with reference to FIGS. 6 and 7 on the basis of two exemplary embodiments.

Here, the valve 4 is designed as a spring-loaded valve which opens or closes in accordance with the rotational speed of the low-pressure shaft 26. In this case, it is envisaged that the valve 4 closes from a predefined rotational speed and, in the closed state, prevents hot compressor air 71 from being able to flow axially forward through the low-pressure shaft 26. Below the predefined rotational speed, in contrast, the valve 4 is open. In the open state of the valve 4, the hot compressor air 71 flows from the axially rear end 262 in the low-pressure shaft 26 to the axially front end 261 of the low-pressure shaft 26.

The opening or closing of the valve 4 thus takes place in accordance with the rotational speed, namely in accordance with the centrifugal force which is exerted on the valve 4. In this case, the valve 4 is designed in such a way that it is open when the low-pressure shaft 26 is stationary and at low rotational speeds. With increasing rotational speed and correspondingly increasing centrifugal force acting on the valve 4, the valve is moved counter to its spring force into the closed position until, from the predefined rotational speed, it completely closes the valve opening to the low-pressure shaft 26.

If the valve 4 is in the open state, the pressurized compressor air 71 flows axially forward through the interior of the low-pressure shaft 26 into a region 95 which is formed radially on the inside with respect to the fan disk 231. In this case, provision is made for means 5 to be formed adjacent to the front periphery of the fan disk 231, which means make it possible for the hot compressor air 71 to flow out of region 95 and to be fed to the outside 2310 of the fan disk 231 in order to heat the latter and the lower region of the fan blades 232.

In the exemplary embodiment illustrated, these means 5 are provided by openings 50, which extend between the upstream end of the fan disk 231 and the downstream end of the nose cone 6. They may be individual openings, which adjoin one another in the circumferential direction, or may be a continuous gap.

Since the valve 4 closes at higher rotational speeds, it is ensured that there is heating of the fan disk 231 only in defined operating states, and therefore there is an increased fuel requirement only in such operating states, but not a fundamental increase. The avoidance of continuous heating of the fan disk 231 by compressor air 71, which would be conceivable as an alternative, is associated, in addition to only a slight increase in fuel consumption, with the further advantage that the nose cone 6 is not heated to excessively high temperatures. Depending on the material of the nose cone 6, it can be designed, for example, for temperatures up to a maximum of 120°.

It is pointed out that, in the case of the gas turbine engine of FIG. 5, there is an additional shaft 29 which runs coaxially in the interior of the low-pressure shaft 26 and rotates at the same rotational speed as the low-pressure shaft 26. The additional shaft 29 provides a safety shaft in the case of a shaft breakage. Such additional shafts 29 are known per se. Owing to the existence of the additional shaft 29, the valve 4 is supported radially on the inside on the outside of the additional shaft 29. However, the existence of an additional shaft 29 is optional. If the additional shaft 29 is not present, the valve 4 extends over the entire cross section of the low-pressure shaft 26, the cross section then being circular.

Figure 6:
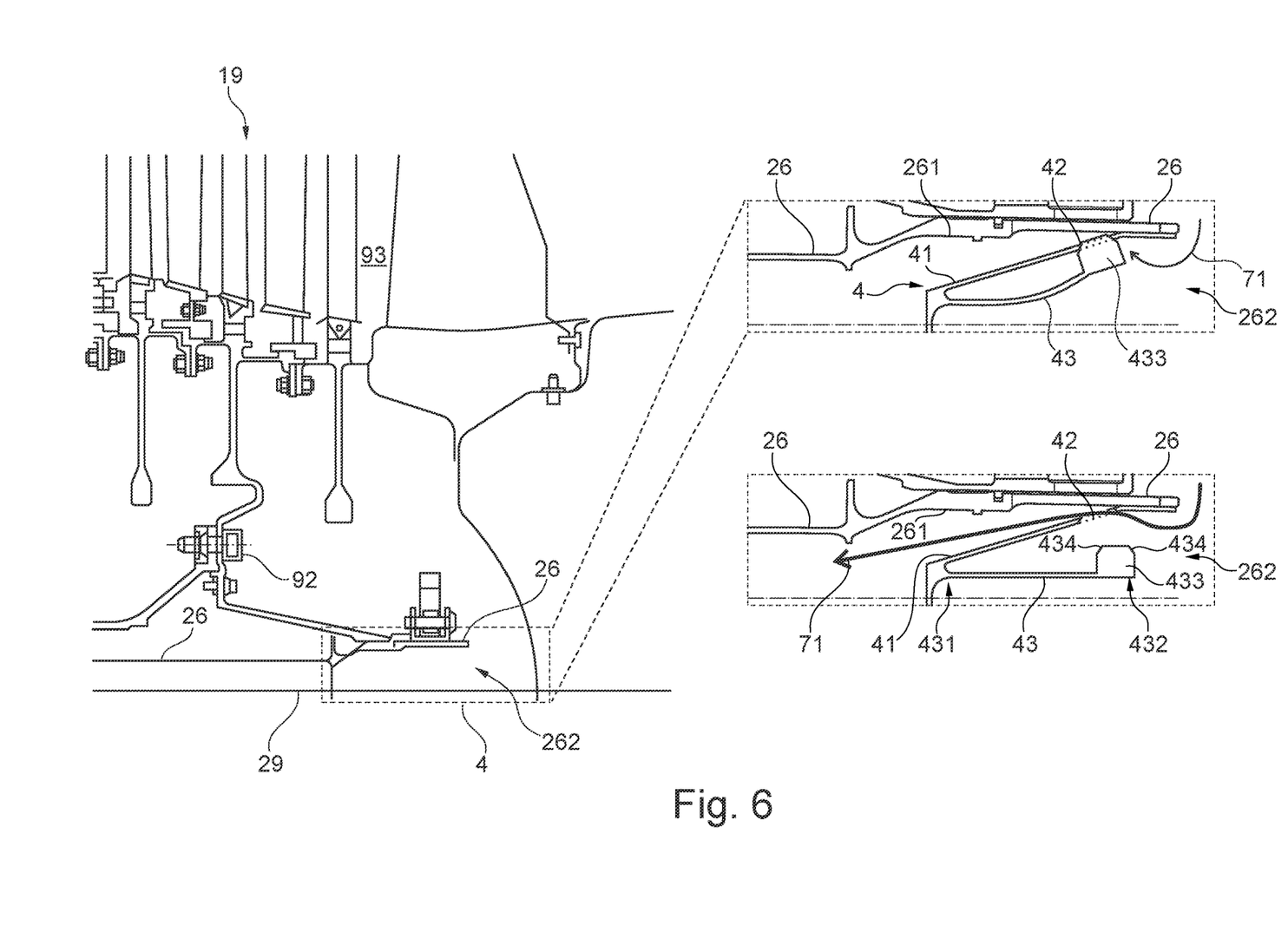
FIG. 6 shows, in an open and a closed position, an exemplary embodiment of the valve of the gas turbine engine of FIG. 5.

FIG. 6 shows, by way of example and schematically, a first exemplary embodiment of the valve 4, the valve 4 being illustrated in the closed state in the illustration at the top right of FIG. 6 and in the open state in the illustration at the bottom right of FIG. 6. The valve 4 comprises a valve body 41, which rests radially on the inside on the additional shaft 29 and radially on the outside on the inside 261 of the low-pressure shaft 26. Latching, stop and/or fastening means (not illustrated) can be provided in order to position the valve body 41 firmly in the interior of the low-pressure shaft 26.

The valve body 41 has an oblique portion, in which a valve opening 42 is formed. The sectional illustration of FIG. 6 shows only one valve opening 42. A multiplicity of such valve openings 42 can be formed in the valve body 41 at a distance from one another in the circumferential direction. Provision can be made here for the valve body 41 to be of rotationally symmetrical design.

The valve 4 further comprises a leaf spring 43. The leaf spring 43 has a first leaf spring end 431, which is articulated on the valve body 41. Furthermore, the leaf spring 43 has a second leaf spring end 432, at which it forms a radially-outward projecting projection 433. The projection 433 forms the closure part of the valve 4 and has chamfers 434, which form a sealing surface of the projection 433.

The leaf spring 43 has an internal stress such that, in the absence of external forces, it extends in the horizontal direction, as shown at the bottom right in FIG. 6. As the rotational speed of the low-pressure shaft 26 increases, the leaf spring 43 and, in particular, the projection 433, are bent radially outward until the projection 433 comes to rest in the valve opening 42 and closes the latter. At low rotational speeds, the valve opening 42 is thus open, enabling hot compressor air 71 to flow through it. At high rotational speeds which are above the predefined rotational speed, the valve opening 42 is closed, on the other hand, because of the centrifugal force acting on the leaf spring 43.

The leaf spring 43 may consist of individual springs, which are each separated from one another in the circumferential direction by gaps, the number of individual springs corresponding to the number of openings 42 to be closed.

Figure 7:
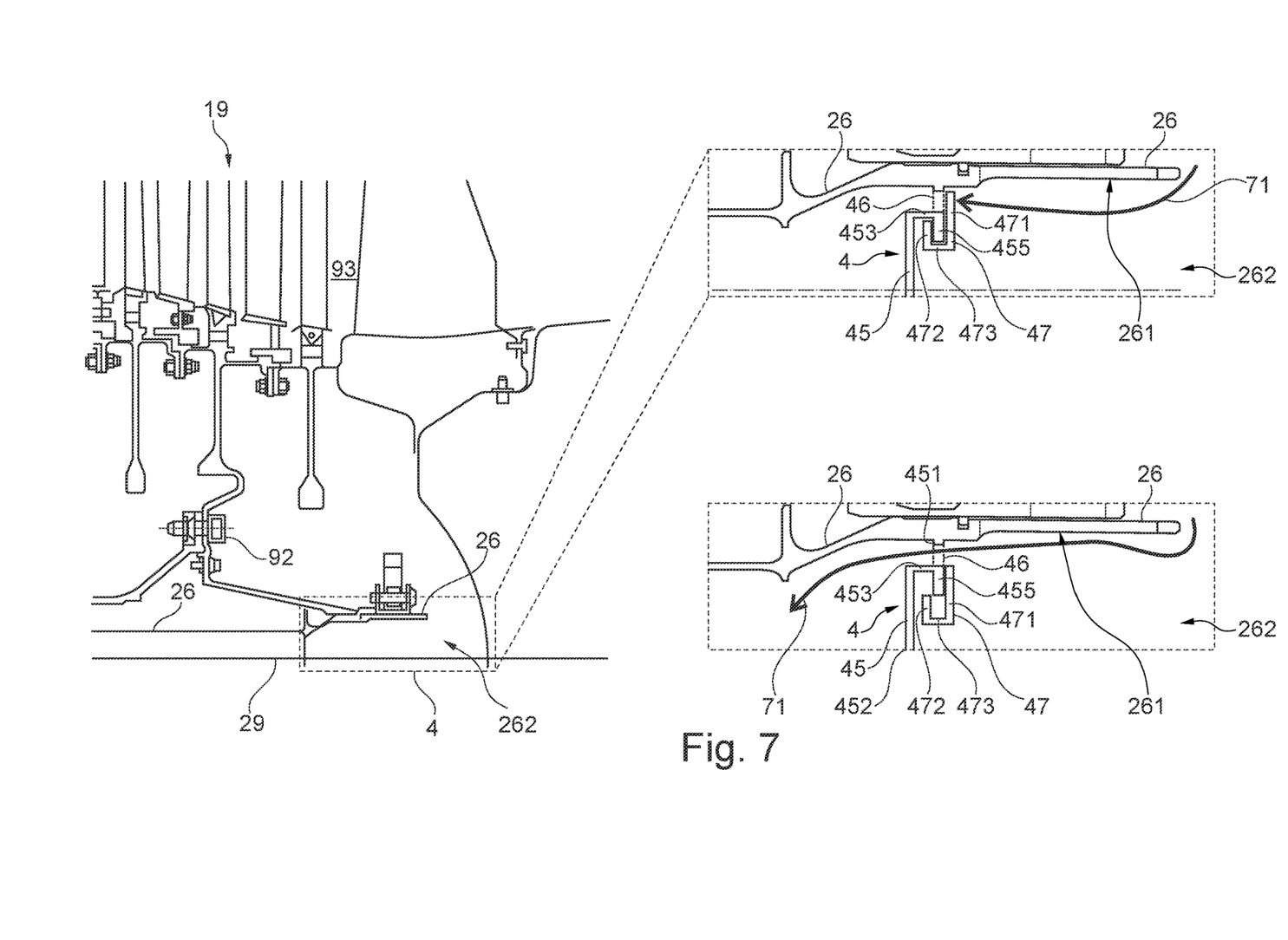
FIG. 7 shows, in an open position and in a closed position, a further exemplary embodiment of the valve of the gas turbine engine of FIG. 5.

Another exemplary embodiment for the valve 4 of FIG. 5 is illustrated in FIG. 7, FIG. 7 illustrating the valve in the closed state in the illustration at the top right and the valve in the open state in the illustration at the bottom right.

The valve 4 comprises a valve ring 45 which extends in the radial direction in the interior of the low-pressure shaft 26. In this case, the valve ring 45 is supported at its radially outer end 251 on the inner wall 261 of the low-pressure shaft 26. At its radially inner end 252, the valve ring 45 is supported on the additional shaft 29. Latching, stop and/or fastening means (not illustrated) can be provided in order to position the valve ring 45 firmly in the interior of the low-pressure shaft 26. It is also pointed out that in the case where no additional shaft 29 is present, the valve ring 45 forms a disk which is supported at its outer periphery on the inner wall 261 of the low-pressure shaft 26.

The valve ring 45 comprises a plurality of valve openings 46, which are formed in the valve ring 45 at a distance from one another in the circumferential direction. These are circular valve openings 46, for example. In order to close the valve openings 46 at high rotational speeds of the low-pressure shaft 26 and thus the valve 4, the valve 4 further comprises a snap ring 47, the radial position of which depends on the rotational speed of the low-pressure shaft 26. In this case, the ends of the snap ring 47, which adjoin one another in the circumferential direction, form between them a gap which widens with increasing rotational speed as a result of the centrifugal force acting on the snap ring 47. This is accompanied by a movement of the snap ring 47 radially outward, with the result that the snap ring closes the openings 46 from the predefined rotational speed onward.

To guide the snap ring 47 on the valve ring 45, the valve ring 45 forms an axial offset with an axial leg 453, at the end of which the valve ring 45 forms a radially inward-projecting further leg 455. This leg 455 serves to guide the snap ring 47 in the radial direction. For this purpose, the snap ring 47 is designed in such a way that it is U-shaped in cross section and has two legs 471, 472, which are spaced apart in the axial direction, run in the radial direction and are connected to one another by a base 473. The U formed by the snap ring 47 in this way is open radially outward. Leg 445 of the valve ring 45 engages in the U formed by the snap ring 47 and accordingly extends between the two legs 471, 472. This ensures that the snap ring 47 expands in a controlled and defined manner with increasing rotational speed in order to cover the openings 46 and to transfer the valve 4 into the closed state.

The exemplary embodiments in FIGS. 6 and 7 represent examples of spring-loaded valves which close a valve opening from a predefined rotational speed of the low-pressure shaft. In this case, the valves are actuated solely mechanically in accordance with the centrifugal force acting on them.

It is self-evident that the invention is not limited to the embodiments described above, and various modifications and improvements can be made without departing from the concepts described herein. Furthermore, except where mutually exclusive, any of the features may be used separately or in combination with any other features, and the disclosure extends to and includes all combinations and sub-combinations of one or more features that are described herein. If ranges are defined, said ranges thus comprise all of the values within said ranges as well as all of the partial ranges that lie in a range.

The invention claimed is:

1. A gas turbine engine comprising:
    an engine core, which comprises at least one compressor, a combustion chamber, a high-pressure turbine and a low-pressure turbine,
    a fan, which is arranged upstream of the engine core and comprises a fan disk and fan blades connected to the fan disk, and
    a low-pressure shaft configured as a hollow shaft, which is coupled to the low-pressure turbine and which drives the fan,
    wherein the low-pressure shaft has an axially front end and an axially rear end, wherein hot compressor air is applied to the axially rear end during operation of the gas turbine engine,
    wherein
    a valve is integrated into an interior of the low-pressure shaft, the valve being configured to open or close in accordance with a rotational speed of the low-pressure shaft, wherein the valve is closed at or above a predefined rotational speed and is open below the predefined rotational speed, and wherein the valve is further configured to:
        in the open state, allow the hot compressor air applied to the axially rear end of the low-pressure shaft to flow from the axially rear end of the low-pressure shaft to the axially front end of the low-pressure shaft, and
        in the closed state, prevent the hot compressor air applied to the axially rear end of the low-pressure shaft from flowing through the low-pressure shaft,
    openings for feeding the hot compressor air flowing axially forward to an outside of the fan disk when the valve is open.

2. The gas turbine engine according to claim 1, wherein the valve is a spring-loaded valve which closes at or above the predefined rotational speed.

3. The gas turbine engine according to claim 2, wherein the valve comprises a valve body, an opening in the valve body and a leaf spring, wherein the leaf spring runs in an axial direction and is configured to:
    be at a distance from the opening in the valve body at low rotational speeds which are below the predefined rotational speed, and
    close the opening in the valve body at high rotational speeds which are above the predefined rotational speed by a centrifugal force acting on the valve body.

4. The gas turbine engine according to claim 2, wherein the leaf spring has a first leaf spring end articulated on the valve body and a second leaf spring end remote from the valve body, wherein the second leaf spring end has a projection which forms a closure part of the valve which closes the opening in the valve body at or above the predefined rotational speed.

5. The gas turbine engine according to claim 4, wherein a sealing surface of the projection is formed by chamfers formed on the projection.

6. The gas turbine engine according to claim 1, wherein the valve comprises a valve ring including at least one opening or a valve disk including at least one opening, wherein the valve ring extends in a radial direction in the interior of the low-pressure shaft and has a radially outer end that rests against an inner wall of the low-pressure shaft, wherein the valve comprises a spring device which closes or opens the at least one opening in accordance with the rotational speed of the low-pressure shaft;

wherein the spring device is a snap ring having ends forming a gap therebetween in a circumferential direction.

7. The gas turbine engine according to claim 6, wherein the snap ring is configured to expand as the rotational speed increases owing to the centrifugal force acting on the snap ring and assumes a shape in which the snap ring closes the at least one opening at or above the predefined rotational speed.

8. The gas turbine engine according to claim 7, wherein:
the snap ring has a U-shaped cross section and has two legs which are spaced apart in an axial direction and run in the radial direction and are connected to one another by a base, wherein the U-shaped cross section opens radially outward,
the valve ring or the valve disk has a radially inward-projecting leg, and
the snap ring is positioned relative to the radially inward-projecting leg such that the radially inward-projecting leg is arranged between the two legs of the snap ring and guides the snap ring in the radial direction.

9. The gas turbine engine according to claim 1, wherein the valve is of annular or circular shape when viewed axially from the axially rear end.

10. The gas turbine engine according to claim 1, and further comprising a co-rotating additional shaft arranged in the low-pressure shaft, wherein the valve is supported radially on the additional shaft inside of the low-pressure shaft.

11. The gas turbine engine according to claim 1, wherein the openings are provided in the fan disk or adjacent to the fan disk.

12. The gas turbine engine according to claim 11, wherein the openings are formed between an upstream end of the fan disk and a downstream end of a nose cone connected to the fan disk.

13. The gas turbine engine according to claim 1, wherein the fan has a blisk construction.

14. The gas turbine engine according to claim 1, wherein the at least one compressor comprises a high-pressure compressor, from which bleed air is branched off, wherein some of the bleed air is fed to the low-pressure turbine as sealing air and forms the hot compressor air which is applied to the axially rear end of the low-pressure shaft during operation of the gas turbine engine.

15. The gas turbine engine according to claim 1, wherein the predefined rotational speed from which the valve is closed is reached at rotational speeds which are present during a descent of an aircraft in which the gas turbine engine is installed.

16. The gas turbine engine according to claim 1, wherein the valve is controlled exclusively mechanically in accordance with a centrifugal force acting on the valve.

* * * * *